(12) United States Patent
Cheng et al.

(10) Patent No.: US 10,514,708 B2
(45) Date of Patent: Dec. 24, 2019

(54) METHOD, APPARATUS AND SYSTEM FOR CONTROLLING UNMANNED AERIAL VEHICLE

(71) Applicant: Beijing Xiaomi Mobile Software Co., Ltd., Haidan District, Beijing (CN)

(72) Inventors: Yue Cheng, Beijing (CN); Yan Xie, Beijing (CN); Yueyue Chu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 88 days.

(21) Appl. No.: 15/704,694

(22) Filed: Sep. 14, 2017

(65) Prior Publication Data
US 2018/0088596 A1   Mar. 29, 2018

(30) Foreign Application Priority Data
Sep. 23, 2016   (CN) .......................... 2016 1 0848392

(51) Int. Cl.
*G05D 1/10*   (2006.01)
*B64C 39/02*   (2006.01)
*G05D 1/00*   (2006.01)

(52) U.S. Cl.
CPC ........... *G05D 1/101* (2013.01); *B64C 39/024* (2013.01); *G05D 1/0011* (2013.01);
(Continued)

(58) Field of Classification Search
CPC ...... G05D 1/101; G05D 1/0011; G05D 1/102; G05D 1/0038; G05D 1/0061;
(Continued)

(56) References Cited

U.S. PATENT DOCUMENTS 8,103,398 B2 * 1/2012 Duggan ............... G05D 1/0061
244/75.1
9,609,288 B1 * 3/2017 Richman ................ H04N 7/183
(Continued)

FOREIGN PATENT DOCUMENTS

CA      2969552 A1   6/2015
CN   202929486 U    5/2013
(Continued)

OTHER PUBLICATIONS

Huang et al., Flight path planning simulation for VTUAV, 2014, IEEE, p. 38-43 (Year: 2014).*
(Continued)

*Primary Examiner* — McDieunel Marc
(74) *Attorney, Agent, or Firm* — Arch & Lake LLP

(57) ABSTRACT

The present invention relates to a method and an apparatus for controlling an unmanned aerial vehicle. The method includes: obtaining a flight area control parameter; determining a flight area based on the flight area control parameter; and causing unmanned aerial vehicle to cruise within the flight area, wherein causing unmanned aerial vehicle to cruise within the flight area includes: determining a flight path within the flight area, and causing unmanned aerial vehicle to fly on the flight path periodically in a reciprocating manner, and the flight area is at least one of: a planar flight area, a linear flight area, and a three-dimensional flight area.

15 Claims, 7 Drawing Sheets

(52) U.S. Cl.
CPC .. *B64C 2201/127* (2013.01); *B64C 2201/141* (2013.01); *B64C 2201/146* (2013.01)

(58) Field of Classification Search
CPC ............ B64C 39/024; B64C 2201/141; B64C 2201/146; G08G 5/0034; H04N 7/183
See application file for complete search history.

(56) References Cited

U.S. PATENT DOCUMENTS

| | | | |
|---|---|---|---|
| 2002/0157233 | A1 | 10/2002 | Randazzo |
| 2009/0157233 | A1 | 6/2009 | Kokkeby et al. |
| 2012/0113754 | A1* | 5/2012 | Husseiny ............... A01M 29/16 367/139 |
| 2015/0226575 | A1 | 8/2015 | Rambo |
| 2015/0346722 | A1* | 12/2015 | Herz .................... G05D 1/0038 701/2 |
| 2016/0284221 | A1* | 9/2016 | Hinkle ................. G08G 5/0034 |
| 2017/0039862 | A1* | 2/2017 | Choi .................... G08G 5/0069 |
| 2019/0023392 | A1* | 1/2019 | Micros ................. B64C 33/025 |

FOREIGN PATENT DOCUMENTS

| | | |
|---|---|---|
| CN | 103781102 A | 5/2014 |
| CN | 104535048 A | 4/2015 |
| CN | 104796611 A | 7/2015 |
| CN | 104808682 A | 7/2015 |
| CN | 104834307 A | 8/2015 |
| CN | 104881037 A | 9/2015 |
| CN | 104991564 A | 10/2015 |
| CN | 105141851 A | 12/2015 |
| CN | 205168851 U | 4/2016 |
| EP | 2071353 A2 | 6/2009 |
| EP | 2685336 A1 | 1/2014 |

OTHER PUBLICATIONS

Barton, Fundamentals of Small Unmanned Aircraft Flight, 2012, INternet, IEEE, 132-149 (Year: 2012).*
Kendoul et al., A visual navigation system for autonomous flight of micro air vehicles, 2009, IEEE, p. 3888-3893 (Year: 2009).*
Partial European Search Report dated Apr. 3, 2018 for EP Application No. 17192401.2, 11 pages.
Chinese Office Actiion issued in CN Patent Application No. 201610848392.6, dated Dec. 5, 2018, 12 pages.
Acevedo, Jose Joaquin, et al., "Distributed Approach for Coverage and Patrolling Missions with a Team of Heterogeneous Aerial Robots Under Communication Constraints," International Journal of Advanced Robotic Systems, vol. 10, (2013), www.intechopen.com, (13 pages).
Copy of CN-OA3 to Chinese Application No. 201610848392.6 dated Sep. 18, 2019, (20 pages).
English Translation of CN-OA3 to Chinese Application No. 201610848392.6 dated Sep. 18, 2019, (28 pages).

* cited by examiner

METHOD, APPARATUS AND SYSTEM FOR CONTROLLING UNMANNED AERIAL VEHICLE

CROSS-REFERENCE TO RELATED APPLICATIONS

This application is based upon and claims priority to the Chinese Patent Application No. 201610848392.6, filed on Sep. 23, 2016, the entire contents of which are incorporated herein by reference.

TECHNICAL FIELD

The present disclosure relates to the field of aircraft technology, and more particularly, to a method and an apparatus for controlling an unmanned aerial vehicle.

BACKGROUND

Unmanned aerial vehicles have become popular among consumers in the market in recent years. The examples of widely used unmanned aerial vehicles may include miniature unmanned aerial vehicles, multi-rotor unmanned aerial vehicles, consumer-level unmanned aerial vehicles, and the like. Sometimes, during the flight of the unmanned aerial vehicle, the flight control command may be sent by a control device to the unmanned aerial vehicle in real time, and the unmanned aerial vehicle may adjust the flying status, such as a flying direction, a distance, and a speed, in real time according to the flight control command.

SUMMARY

The present disclosure provides methods and apparatus for controlling an unmanned aerial vehicle.

According to a first aspect of the present disclosure, a method for controlling an unmanned vehicle is provided. The method may include obtaining a flight area control parameter, determining a flight area based on the flight area control parameter; and causing the unmanned aerial vehicle to cruise within the flight area, where causing the unmanned aerial vehicle to cruise within the flight area may include determining a flight path within the flight area, and causing the unmanned aerial vehicle to fly on the flight path periodically in a reciprocating manner, and where the flight area is at least one of: a planar flight area, a linear flight area, and a three-dimensional flight area.

According to a second aspect of the present disclosure, an apparatus for controlling an unmanned aerial vehicle is provided. The apparatus may include a processor, a memory for storing instructions executable by the processor, where the processor may be configured to: receive a flight area control parameter transmitted by a control device, determine a flight area based on the flight area control parameter, and control the unmanned aerial vehicle to cruise within the flight area, where the processor may be further configured to: determine a flight path within the flight area, and control the unmanned aerial vehicle to fly on the flight path periodically in a reciprocating manner, and where the flight area is one of: a planar flight area, a linear flight area and a three-dimensional flight area.

According to a third aspect of the present disclosure, an apparatus for controlling an unmanned aerial vehicle is provided. The apparatus may include a processor, a memory for storing instructions executable by the processor, where the processor may be configured to: acquire a first setting instruction corresponding to a flight area of the unmanned aerial vehicle, generate a flight area control parameter according to the first setting instruction, and transmit the flight area control parameter to the unmanned aerial vehicle; wherein the unmanned aerial vehicle is configured to determine the flight area based on the flight area control parameter and cruise within the flight area, where the flight area is one of: a planar flight area, a linear flight area, and a three-dimensional flight area.

It is to be understood that both the foregoing general description and the following detailed descriptions are exemplary and explanatory only and are not restrictive of the invention, as claimed.

BRIEF DESCRIPTION OF THE DRAWINGS

The accompanying drawings, which are incorporated in and constitute a part of this specification, illustrate examples consistent with the invention and, together with the description, serve to explain the principles of the invention.

Figure 1:
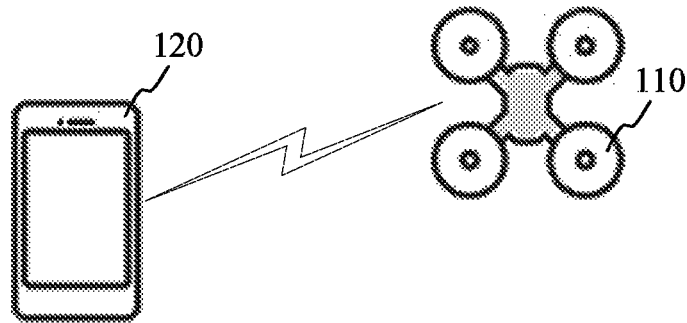
FIG. 1 shows a schematic diagram of an implementation environment according to an aspect of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Examples of the present disclosure are illustrated in the accompanying drawings. The following description refers to the accompanying drawings in which the same numbers in different drawings represent the same or similar elements unless otherwise represented. The implementations set forth in the following description of examples of the present disclosure may not represent all implementations consistent with the present disclosure. Instead, they are merely examples of apparatuses and methods consistent with aspects related to the present disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment," "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

FIG. 1 shows a schematic diagram of an implementation environment shown in accordance with an aspect of the present disclosure. The implementation environment may include an unmanned aerial vehicle 110 and a control device 120.

The unmanned aerial vehicle 110 may include a flight controller, which may include a programmed processor, and a physical device which may be described as a flying physical device hereinafter. The flying physical device may be connected to the flight controller for performing a flying action under the control of the flight controller. Optionally, the unmanned aerial vehicle 110 is equipped with one or more of the following sensors: a positioning sensor which may be a GPS sensor, an acceleration sensor which may be referred to as a gravity sensor, an angular velocity sensor which may be referred to as a gyroscope, a height sensor, and the like. Optionally, the unmanned aerial vehicle 110 is equipped with an image acquisition device such as a camera to provide an aerial photography function.

A communication connection may be established between the unmanned aerial vehicle 110 and the control device 120 over the wireless network. For example, the wireless network may be a cellular mobile network, a Wireless Fidelity (WiFi) network, a Bluetooth network, or the like.

The control device 120 may be used to control the unmanned aerial vehicle 110. The control device 120 may be used to send a flight control command to the flight controller of the unmanned aerial vehicle 110 so that the flight controller controls the flying physical device to perform the flight according to the flight control command. The control device 120 may be a mobile terminal such as a mobile phone or a tablet computer. The control device 120 may also be a dedicated remote control equipped by the unmanned aerial vehicle 110. For example, the control device may be a flying remote controller or other controllers.

In some control methods, during the flight of the unmanned aerial vehicle, the user may need to provide a real-time control regarding the flight status of the unmanned aerial vehicle. Such requirement may be high for the user. Thus, the automatic flight capability of the unmanned aerial vehicle may not be very good. As such, the examples of the present disclosure provide a method for controlling an unmanned aerial vehicle, as well as an apparatus and system based on this method to solve the above-described problems.

Figure 2:
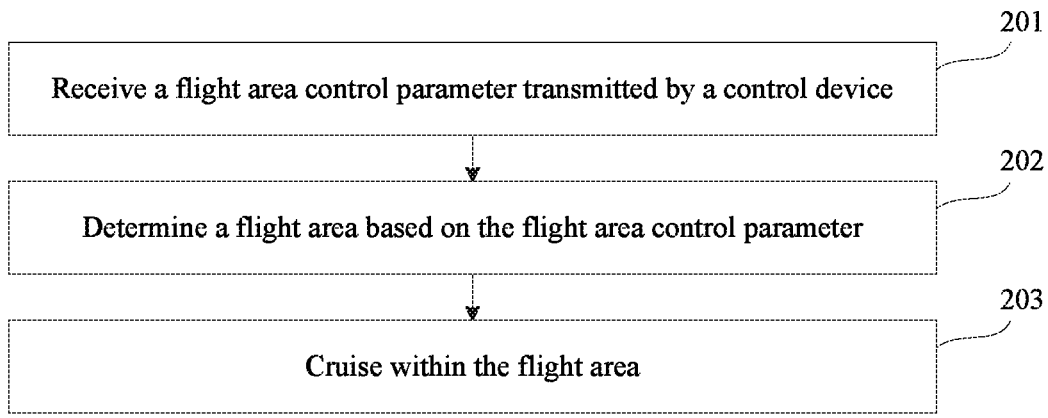
FIG. 2 shows a flow chart of a method for controlling an unmanned aerial vehicle according to an aspect of the present disclosure.

FIG. 2 shows a flow chart of a method for controlling an unmanned vehicle according to an aspect of the present disclosure. The method may be applied to the unmanned aerial vehicle in the implementation environment shown in FIG. 1. The method may include the following steps.

In step 201, a flight area control parameter transmitted by the control device is received.

In step 202, a flight area is determined based on the flight area control parameter.

In step 203, a cruising is performed within the flight area.

In view of the above, in the method provided by the present disclosure, the unmanned aerial vehicle may receive the flight area control parameter transmitted by the control device, and may determine the flight area based on the flight area control parameter, and then the unmanned aerial vehicle may cruise or may be caused by the flight area control parameter to cruise within the flight area.

As will be explained in further detail, using this method, a variety of challenges present in traditional unmapped flying or other remotely-controlled vehicles can be overcome. For example, in the course of the flight of the unmanned aerial vehicle, the user may need to control the flight status of the unmanned aerial vehicle in real time. In many cases, continuous real-time control may be too demanding for the user. As a result, the controlling the flight may be overwhelming to the user. On the other hand, the present systems and methods may achieve the following effects: the unmanned aerial vehicle performs automatic cruising in the pre-set flight area, the user control may be unnecessary in the flight process, and the automatic flight capability of the unmanned aerial vehicle can be improved.

Figure 3:
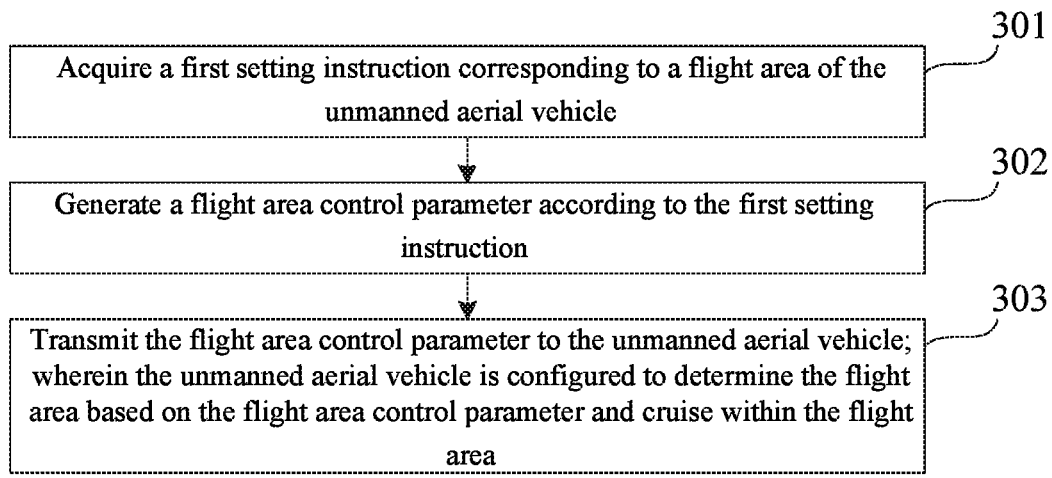
FIG. 3 shows a flow chart of a method for controlling an unmanned aerial vehicle according to another aspect of the present disclosure.

FIG. 3 shows a flow chart of a method for controlling an unmanned vehicle according to another aspect of the present disclosure. This method may be applied to the control device in the implementation environment shown in FIG. 1. The method may include the following steps.

In step 301, a first setting instruction corresponding to a flight area of the unmanned aerial vehicle is acquired.

In step 302, a flight area control parameter is generated according to the first setting instruction.

In step 303, the flight area control parameter is transmitted to the unmanned aerial vehicle where the unmanned aerial vehicle is configured to determine the flight area based on the flight area control parameter and cruise within the flight area.

In view of the above, in the method provided by the present disclosure, the control device may generate the flight area control parameter according to the first setting instruction and may transmit the flight area control parameter to the unmanned aerial vehicle. The unmanned aerial vehicle may determine the flight area based on the flight area control parameter and may cruise within the flight area.

By implementing this method, various drawbacks of traditional systems can be overcome. For example, in the course of the flight of the unmanned aerial vehicle, the user may need to control the flight status of the unmanned aerial vehicle in real time, and such requirement may be too demanding for the user. Thus, the flight of the unmanned aerial vehicle is poor. The method may also achieve the following effects, as well as others: the unmanned aerial vehicle may perform automatic cruising in the pre-set flight area, the user control may be unnecessary in the flight process, and the automatic flight capability of the unmanned aerial vehicle may be improved.

Figure 4A:
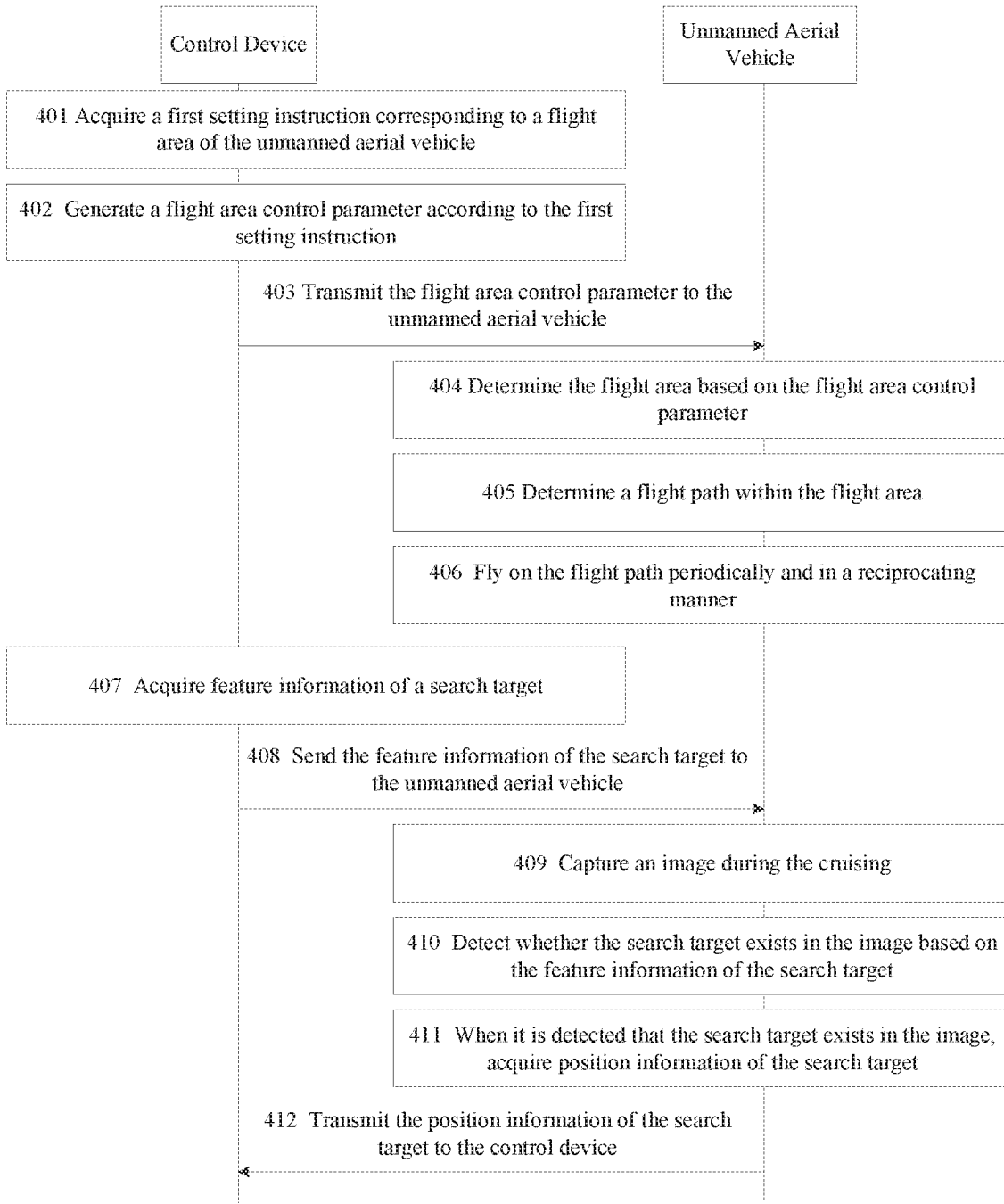
FIG. 4A shows a flow chart of a method for controlling an unmanned aerial vehicle according to another aspect of the present disclosure.

FIG. 4A shows a flow chart of a method for controlling an unmanned aerial vehicle according to another aspect of the present disclosure. This method may be applied to the implementation environment shown in FIG. 1. The method may include the following steps.

In step 401, the control device acquires a first setting instruction corresponding to a flight area of the unmanned aerial vehicle.

The user may trigger the first setting instruction to set the flight area of the unmanned aerial vehicle. The set flight area may be a plane flight area, or may be a linear flight area, or may be a three-dimensional flight area. Sometimes, the plane flight area may refer to a horizontal plane flight area, that is, a plane area parallel to the ground. In other possible examples, the plane flight area may also be a vertical plane flight area, or may be an oblique plane flight area.

The vertical plane flight area may refer to a planar area perpendicular to the ground, and the oblique plane flight area may refer to a planar area having an angle greater than 0° and less than 90° from the ground. The plane flight area may have a rectangular, triangular, round, semicircular, regular or irregular polygonal shape.

The linear flight area may refer to an area obtained by flying along a straight line. For example, the linear flight area may be an area obtained by flying along a straight line segment perpendicular to the ground. The three-dimensional flight area may refer to a three-dimensional area within a three-dimensional space, for example, the three-dimensional flight area may be a cube, cylinder, cone, sphere, hemisphere or other shapes.

In one example, based on a current geographic location of the unmanned aerial vehicle, the control device may display a map of an area surrounding the current geographic location. The map may be a two-dimensional map, or may be a three-dimensional map. The control device may obtain a first setting instruction entered in the map. For example, the first setting instruction may be used to set a vertex and/or an edge of the flight area of the unmanned aerial vehicle. The user may trigger the first setting instruction by clicking, sliding or performing other operations in the map to set the vertex and/or edge of the flight area of the unmanned aerial vehicle.

In step 402, the control device generates a flight area control parameter according to the first setting instruction.

The flight area control parameter may be used to indicate the flight area of the unmanned aerial vehicle. Optionally, the flight area control parameter includes positions of the individual vertexes of the flight area. The position of the vertex may be represented by absolute coordinates of the vertex in the map such as latitude and longitude coordinates and a height coordinate. The position of the vertex may also be represented by the relative coordinates of the vertex relative to a reference point such as a direction and a distance relative to the reference point. The reference point may be a pre-set point in the map, or may be other vertices.

In one example, the control device constructs the flight area according to the first setting instruction, acquires the position of each vertex of the flight area, and sends the flight area control parameter to the unmanned aerial vehicle. The flight area control parameter may include the position of each vertex of the flight area.

In step 403, the control device sends the flight area control parameter to the unmanned aerial vehicle.

The control device may transmit the flight area control parameter to the unmanned aerial vehicle via a wireless communication connection established with the unmanned aerial vehicle. Correspondingly, the unmanned aerial vehicle may receive the flight area control parameter sent by the control device.

In step 404, the unmanned aerial vehicle determines the flight area based on the flight area control parameter.

In one example, the unmanned aerial vehicle may determine the flight area based on the positions of the individual vertices of the flight area. After that, the unmanned aerial vehicle may cruise within the flight area. Cruising of an unmanned aerial vehicle may refer to an automatic flight in a set flight area with a flight path throughout the entire flight area. Such cruising may also be called a blanket search or an inch-by-inch search. That is, the flight is implemented in an intensive and reciprocating manner throughout the entire flight area. Sometimes, the unmanned aerial vehicle may perform the cruising within the flight area. Cruising may include the following steps 405 and 406.

In step 405, the unmanned aerial vehicle determines a flight path within the flight area.

In one possible implementation, the unmanned aerial vehicle acquires a flight path selected from a pre-set flight path library and transmitted by the control device. The control device may select the flight path within the flight area from the pre-set flight path library and sends the selected flight path to the unmanned aerial vehicle.

The flight path library may include multiple flight paths. The control device may automatically select the flight path from the flight path library. Alternatively, it is possible to select the flight path by the user from the flight path library. The control device may present the flight paths in the flight path library to the user, and the user may select one or more flight paths from the flight path library as the flight path within the flight area. The control device may transmit an identification of the flight path selected by the user to the unmanned aerial vehicle, the unmanned aerial vehicle may determine the flight path selected by the user according to the above-mentioned identification, and may use the flight path selected by the user as the flight path within the flight area.

In another possible implementation, the unmanned aerial vehicle obtains a flight path customized by a user. The control device may acquire a flight path customized by the user within the above-mentioned flight area and sends the flight path to the unmanned aerial vehicle. Illustratively, the control device may acquire a second setting instruction corresponding to the flight path of the unmanned aerial vehicle, and generates a flight path control parameter according to the second setting instruction. The control device may then transmit the flight path control parameter to the unmanned aerial vehicle.

The flight path control parameter may include positions of at least two passing points through which the flight path customized by the user passes, and the flight path control parameter may be used for indicating a flight path within the flight area. The at least two passing points may include at least two end points of the flight path. Sometimes, the at least two passing points may further include at least one position point through which the flight path passes.

Correspondingly, the unmanned aerial vehicle may receive the flight path control parameter sent by the control device. The unmanned aerial vehicle may determine the flight path customized by the user according to the above-mentioned flight path control parameter.

The positions of the passing points may be expressed by the absolute coordinates such as latitude and longitude coordinates and height coordinates of the points in the map. The positions of the passing points may also be expressed by the relative coordinates of the passing points relative to a reference point such as directions and distances relative to the reference point.

Figure 4B:
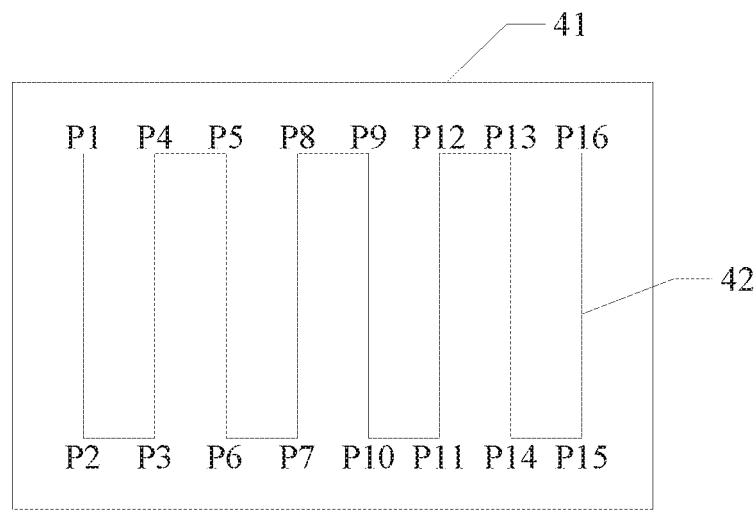
FIGS. 4B/4C/4D/4E show schematic diagrams of exemplary flight paths.

The reference point may be a pre-set point in the map, or may be other passing point such as the waypoint. For example, as shown in FIG. 4B, the flight area is the illustrated planar area 41, and the flight path 42 includes 16 passing points P1 to P16 as shown in FIG. 4B. The unmanned aerial vehicle may determine the flight path 42 according to the positions of respective passing points. The flight path may be customized by the user in advance so that the setting of the flight path is more flexible and the user's need can be better satisfied.

In other possible implementations, the flight path may also be automatically selected from the flight path library by the unmanned aerial vehicle. Alternatively, the flight path in the flight area may also be automatically planned by the unmanned aerial vehicle or the control device according to the flight area. For example, after determining the flight area, the unmanned aerial vehicle or the control device may automatically plan to generate a flight path throughout the whole flight area based on the determined flight area.

Figure 4C:
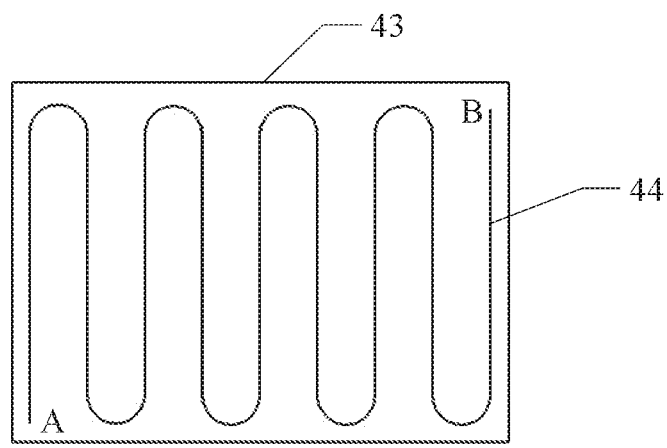

Schematic diagrams of two flight paths may be used as examples. In one example, the flight area is a planar flight area, and both ends of the flight path are located in the plane flight area. The flight path runs throughout the entire plane flight area. Optionally, the flight path may or may not be a straight line, the flight path may have an S shape, a Z shape, an S-like shape or a Z-like shape. As shown in FIG. 4C, the flight area is the shown plane flight area 43, both ends of the flight path 44 are shown as a position A and a position B. In FIG. 4C, the flight path 44 has the S shape.

In another example, the flight area is a three-dimensional flight area, and the flight path may include n flight sub-paths, each of them may be located in one plane area in the three-dimensional flight area, wherein n is an integer greater than 1. The $i^{th}$ flight sub-path is located in the $i^{th}$ planar area, a first end of the first flight sub-path is a first end of the flight path, a second end of the $i^{th}$ flight sub-path is coincident with a first end of the $(i+1)^{th}$ flight sub-path, and a second end of the $n^{th}$ flight path is the second end of the flight path, wherein i is a positive integer.

Figure 4D:
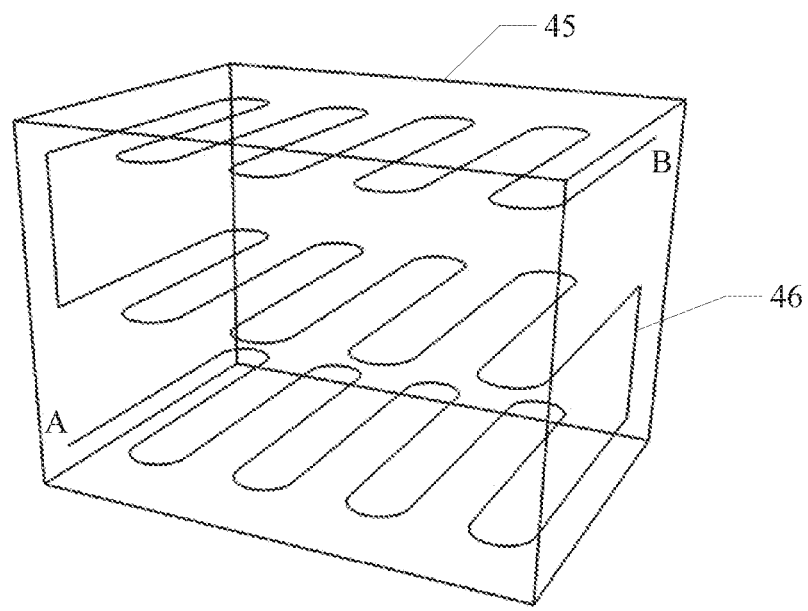

Optionally, the n planar areas may include a horizontal planar area and a vertical planar area that are spaced apart. Optionally, the flight sub-path in the horizontal plane area and/or the flight sub-path in the vertical plane have an S shape, a Z shape, an S-like shape or a Z-like shape in addition to a straight line. For example, as shown in FIG. 4D, the flight area is the illustrated three-dimensional flying area 45, both ends of the flight path 46 are shown as a position A and a position B. In FIG. 4C; the flight path 46 has the S shape in the horizontal plane area, and the flight path 46 is straight in the vertical plane area.

The flight paths provided by the above examples run throughout the entire flight area. When the unmanned aerial vehicle performs cruising following the flight path within the flight area, the unmanned aerial vehicle can reach various locations of the flight area, and thus may create a good cruising effect.

Figure 4E:
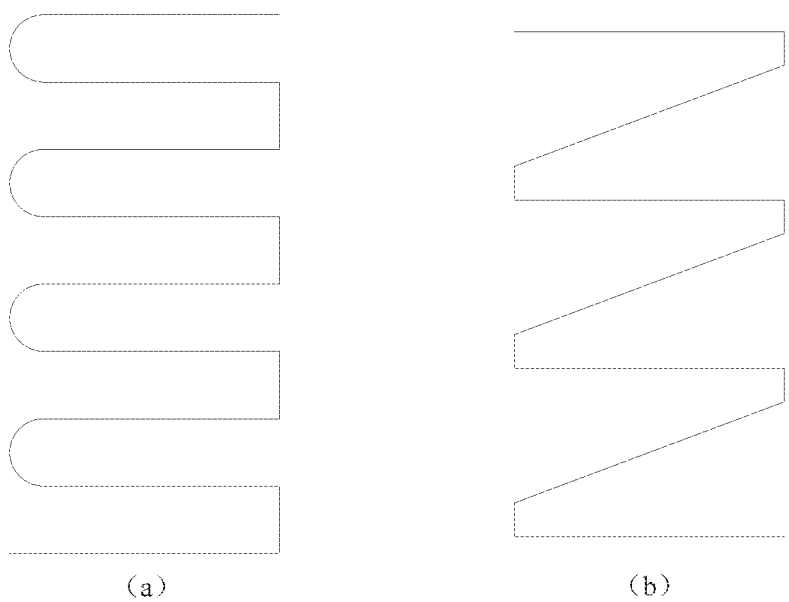

It is to be noted that, in the examples of the present disclosure, the S-like shape may refer to a shape that is close to or similar to the S shape, and the Z-like shape may refer to a shape that is close to or similar to the Z shape. Illustratively, as shown in FIG. 4E, the left side portion (a) of FIG. 4E shows a schematic diagram of a flight path having the S-like shape, and the right side portion (b) of FIG. 4E shows a flight path having the Z-like shape.

In step 406, the unmanned aerial vehicle flies on the flight path periodically and in a reciprocating manner.

First, the unmanned aerial vehicle may fly or may be caused to fly along the flight path to the second end of the flight path by using the first end of the flight path as a starting point, and then may fly along the flight path to the first end of the flight path by using the second end of the flight path as the starting point.

After that, the unmanned aerial vehicle may perform the steps from the step of flying along the flight path to the second end of the flight path by using the first end of the flight path as the starting point again. One flight cycle may refer to a flight from the first end of the flight path to the second end along the flight path, and then returning from the second end of the flight path to the first end along the flight path.

For example, in FIG. 4D, the unmanned aerial vehicle first travels from the position A along the flight path 46 to the position B, and then returns to the position A from the position B along the flight path 46. The unmanned aerial vehicle can repeat the above process to achieve periodic and reciprocal flight on the flight path 46.

Sometimes, the user may also set parameters such as a flight time, a number of times of flights, and a flight speed of the unmanned aerial vehicle in advance. For example, the control device may acquire at least one of the following setting instructions: a third setting instruction corresponding to the flight time of the unmanned aerial vehicle, a fourth setting instruction corresponding to the number of times of flights of the unmanned aerial vehicle, and a fifth setting instruction corresponding to the flight speed of the unmanned aerial vehicle.

If the unmanned aerial vehicle obtains the above third setting instruction, the unmanned aerial vehicle may generate a flight time control parameter according to the third setting instruction, and the flight time control parameter may be used to indicate the flight time in the flight area. Illustratively, the flight time control parameter may include a continuous flight duration, or may include a start flight time and an end flight time, or may include a start flight time and a continuous flight duration, and so on.

If the unmanned aerial vehicle obtains the above-mentioned fourth setting instruction, the unmanned aerial vehicle may generate a flight number control parameter according to the fourth setting instruction, and the flight number control parameter may be used to indicate the number of times of flights in the flight area. The cruising in the flight area may be recorded as one time of flight. The number of times of flights may refer to the number of times of repeating the flight cycle. For example, when the number of times of flights is ten, the unmanned aerial vehicle repeats ten flight cycles.

If the unmanned aerial vehicle obtains the fifth setting instruction, the unmanned aerial vehicle may generate a flight speed control parameter based on the fifth setting instruction, and the flight speed control parameter may be used to indicate a flight speed in the flight area. Illustratively, the flight speed control parameter may be a fixed value, or it may be a value interval, or it may be a variable that can change over time.

The control device may send at least one of the following parameters to the unmanned aerial vehicle: the flight time control parameter, the flight number control parameter, and the flight speed control parameter. Correspondingly, the unmanned aerial vehicle may receive at least one of the following parameters transmitted by the control device: the flight time control parameter, the flight number control parameter, and the flight speed control parameter.

If the unmanned aerial vehicle receives the flight time control parameter sent by the control device, the unmanned aerial vehicle may determine the flight time in the above-mentioned flight area according to the flight time control parameter. If the unmanned aerial vehicle receives the flight number control parameter sent by the control device, the unmanned aerial vehicle may determine the number of flights in the above-mentioned flight area based on the flight number control parameter. If the unmanned aerial vehicle receives the flight speed control parameter transmitted by the control device, the unmanned aerial vehicle may determine the flight speed in the above-mentioned flight area according to the flight speed control parameter.

Sometimes, the default control parameters may be obtained and may be stored in the unmanned aerial vehicle in the event that the unmanned aerial vehicle is unable to receive the flight control parameters due to the communication issues while the unmanned aerial vehicle is flying in the air. For example, a default flight time, a default flight speed and/or a default number of flights may be set for the unmanned aerial vehicle and those default parameters may be saved in a storage area of the unmanned aerial vehicle and may be read and used while the unmanned aerial vehicle is flying in the area.

It should be noted that every time the control device sends the flight control command to the unmanned aerial vehicle, the flight control command may carry one control parameter or may carry a plurality of control parameters.

Optionally, the unmanned aerial vehicle is also equipped with an image acquisition device such as a camera, and the method provided by the present example may further include the following steps.

In step 407, the control device acquires feature information of a search target.

The search target may be an object such as a vehicle, a house, a building, a lake, or may be a person. The feature information of the search target may be an image of the search target. The feature information may also be extracted from the image of the search target.

Sometimes, the image of the search target may be provided by the user to the control device. For example, when a user needs to search for a vehicle, the photograph of the vehicle may be provided by the user to the control device. The control device may use the image of the vehicle as the feature information of the search target. Alternatively, the control device may use a relevant image feature extraction algorithm to extract the image feature from the vehicle's photograph as the feature information of the search target.

In step 408, the control device sends the feature information of the search target to the unmanned aerial vehicle.

Accordingly, the unmanned aerial vehicle receives the feature information of the search target transmitted by the control device.

In step 409, the unmanned aerial vehicle captures an image during cruising.

The image collected by the unmanned aerial vehicle may be a photograph or a video. In one example, the unmanned aerial vehicle turns on the camera mode and collects the video in real time in the process of cruising.

In step 410, the unmanned aerial vehicle detects whether or not the search target exists in the image based on the feature information of the search target.

In one example, the unmanned aerial vehicle identifies the captured image, and in conjunction with the feature information of the search target, detects whether the search target exists in the image.

In step 411, when it is detected that the search target exists in the image, the unmanned aerial vehicle acquires position information of the search target.

The position information of the search target may be used to indicate the location of the search target. For example, the position information of the search target may include latitude and longitude coordinates of the search target. Optionally, the position information of the search target may also include a height coordinate of the search target.

In step 412, the unmanned aerial vehicle transmits the position information of the search target to the control device.

Accordingly, the control device may receive the position information of the search target transmitted by the unmanned aerial vehicle.

After receiving the position information of the search target, the control device may display the position information of the search target. For example, the control device labels the position information of the search target in the map so that the user can know the location of the search target and can act accordingly.

In the above example, a condition in which the unmanned aerial vehicle detects whether the search target exists in the image may be used as an example. In other possible examples, after acquiring the image, the unmanned aerial vehicle may directly send the image to the control device, and the control device may detect whether or not the search target exists in the image based on the feature information of the search target. Sometimes, according to the handling capacity of the unmanned aerial vehicle, the network quality between the unmanned aerial vehicle and the control device, and other factors, an appropriate way may be selected for detecting whether the search target is identified. Such appropriate way may be different from the above-mentioned methods.

Sometimes, the flight area may be adjusted. For example, when the unmanned aerial vehicle detects that the search target exists based on the feature information. There may be a need for the unmanned aerial vehicle to capture images of the detected target or check details of the detected search target. As such, the original flight area may be adjusted to set a new flight area for the unmanned aerial vehicle. The new flight area may be set according to the location of the detected search target such that the images of the search target can be captured while the unmanned aerial vehicle is flying in the new flight area. In general, the adjusted new flight area may be smaller than the original flight area as the adjusted new flight area may be for the unmanned aerial vehicle to fly around the detect search target to capture images and obtain details of the search target.

However, sometimes, the adjusted flight area may be bigger than the original flight area. For example, when the search target can't be detected in the original flight area, the flight area may be adjusted to a bigger flight area and the unmanned aerial vehicle may be able to search a bigger area for the search target.

In the above-described examples, the set flight area is automatically captured or monitored using the unmanned aerial vehicle. Alternatively, the image may be identified and analyzed based on the image acquired by using the unmanned aerial vehicle. Thus, the search target may be searched and positioned.

In the method provided by the present disclosure, the unmanned aerial vehicle may receive the flight area control parameter sent by the control device, determine the flight area based on the flight area control parameter, and then cruises in the flight area. Thus, the following problem may be solved: in the course of the flight of the unmanned aerial vehicle, the user needs to control the flight status of the unmanned aerial vehicle in real time, whereas such requirement is too high for the user, and therefore, the automatic flight capability of the unmanned aerial vehicle is poor. The current method achieves the following effects: the unmanned aerial vehicle can perform automatic cruising in the pre-set flight area, and the user control can become unnecessary in the flight process. Thus, the automatic flight capability of the unmanned aerial vehicle is improved.

In addition, the information in the flight area such as image data may be acquired by the intensive and reciprocating flight of the unmanned aerial vehicle throughout the entire flight area. Therefore, the automatic area monitoring or searching is enabled.

It should be noted that the steps of the unmanned aerial vehicle in the above-described examples may be separately implemented as a control method on the unmanned aerial vehicle side, and the steps of the control device may be separately implemented as a control method on the control device.

The followings are apparatus examples of the present disclosure, which may be used to carry out the method examples of the present disclosure. For the details that are not disclosed in the apparatus examples, reference may be made to the method examples of the present disclosure.

Figure 5A:
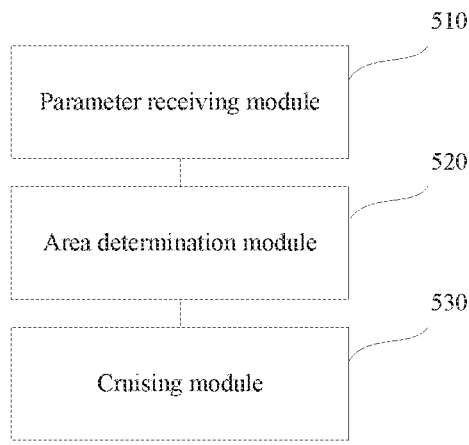
FIG. 5A shows a block diagram of an apparatus for controlling an unmanned aerial vehicle according to an aspect of the present disclosure.

FIG. 5A shows a block diagram of an apparatus for controlling an unmanned aerial vehicle according to an aspect of the present disclosure. The device has the functions that implement the individual steps of the above-described method at the unmanned aerial vehicle side. The functions may be implemented by hardware, or may be implemented by hardware executing the corresponding software. The apparatus may include a parameter receiving module 510, an area determining module 520, and a cruising module 530.

The parameter receiving module 510 may be configured to receive a flight area control parameter transmitted by a control device.

The area determination module 520 may be configured to determine a flight area based on the flight area control parameter.

The cruising module 530 may be configured to cruise within the flight area.

In the apparatus provided by the present example, the unmanned aerial vehicle may receive the flight area control parameter transmitted by the control device, may determine the flight area based on the flight area control parameter, and then may cruise in the flight area. By this way, the following problem may be solved: in the course of the flight of the unmanned aerial vehicle, the user needs to control the flight status of the unmanned aerial vehicle in real time, such requirement may be too high for the user, and thus the automatic flight capability of the unmanned aerial vehicle is poor. The following effects can be achieved: the unmanned aerial vehicle may perform automatic cruising in the pre-set flight area, the user control is unnecessary in the flight process, and the automatic flight capability of the unmanned aerial vehicle can be improved.

Figure 5B:
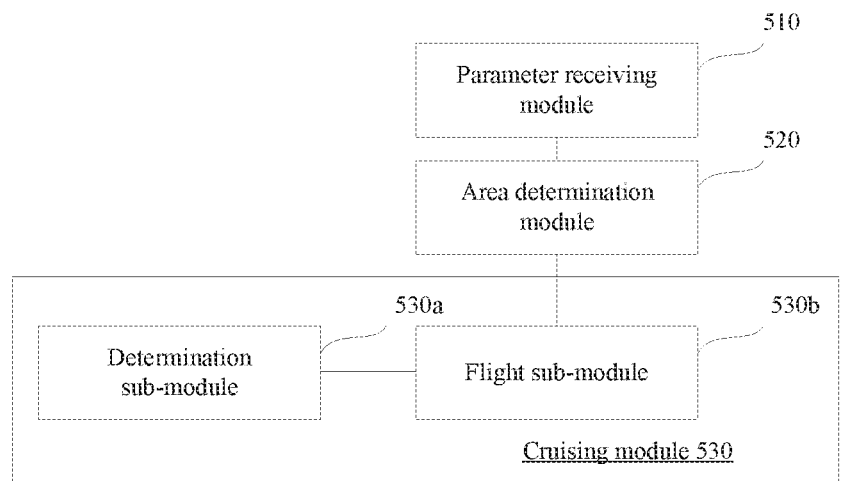
FIG. 5B shows a block diagram of an apparatus for controlling an unmanned aerial vehicle according to another aspect of the present disclosure.

In an alternative example provided based on the example shown in FIG. 5A, as shown in FIG. 5B, the cruising module 530 may include: a determination sub-module 530a and a flight sub-module 530b.

The determination sub-module 530a may be configured to determine a flight path within a flight area.

The flight sub-module 530b may be configured to fly on the flight path periodically and in a reciprocating manner.

In one example, the determination sub-module 530a may include a first determination sub-module configured to obtain a user-defined flight path. Alternatively, a second determination sub-module may be configured to acquire a flight path selected by the control device from a pre-set flight path library.

In one example, the first determination sub-module may be configured to determine a flight path customized by the user based on the flight path control parameter transmitted by the control device. The flight path control parameter may include locations of at least two passing points of the user-defined flight path.

In one example, the flight area is a planar flight region, a linear flight region, or a three-dimensional flight region.

In one example, the flight sub-module 530b may be configured to fly along the flight path to a second end of the flight path starting from a first end of the flight path, fly along the flight path to the first end of the flight path starting from the second end of the flight path, and then fly along the flight path to the second end of the flight path starting from the first end of the flight path again. The above flight path may be repeated again and again.

Optionally, the parameter receiving module 510 may be further configured to receive at least one of the following parameters transmitted by the control device: a flight time control parameter, a flight number control parameter, and a flight speed control parameter. The flight time control parameter may be used to indicate a flight time within the flight area, the flight number control parameter may be used to indicate a number of times of flights in the flight area where cruising in the flight area for one cycle may be recorded as one flight, and the flight speed control parameter may be used to indicate a flight speed within the flight area.

Figure 5C:
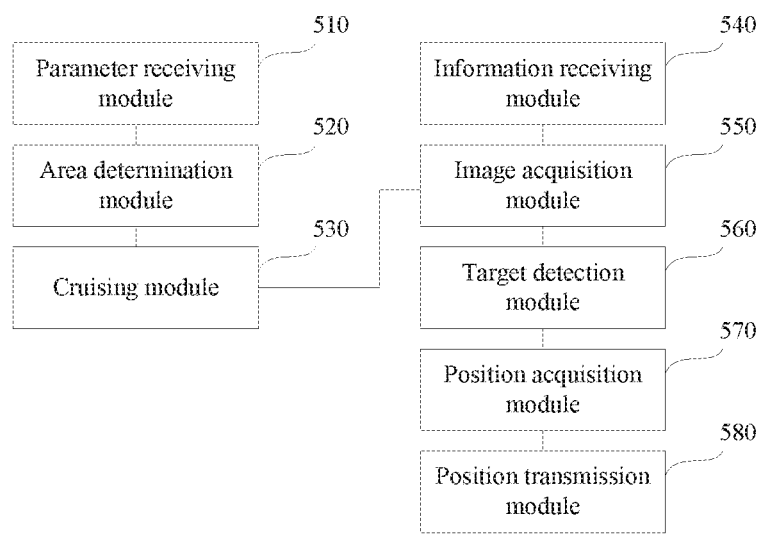
FIG. 5C shows a block diagram of an apparatus for controlling an unmanned aerial vehicle according to another aspect of the present disclosure.

In another alternative example provided based on the example shown in FIG. 5A, as shown in FIG. 5C, the apparatus further may include: an information receiving module 540, an image acquisition module 550, a target detection module 560, a position acquisition module 570, and a position transmission module 580.

The information receiving module 540 may be configured to receive feature information of a search target transmitted by the control device.

The image acquisition module 550 may be configured to acquire an image during cruising.

The target detection module 560 may be configured to detect whether or not the search target exists in the image based on the feature information of the search target.

The position acquisition module 570 may be configured to acquire position information of the search target when it is detected that the search target exists in the image.

The position transmission module 580 may be configured to transmit the position information of the search target to the control device.

Figure 6A:
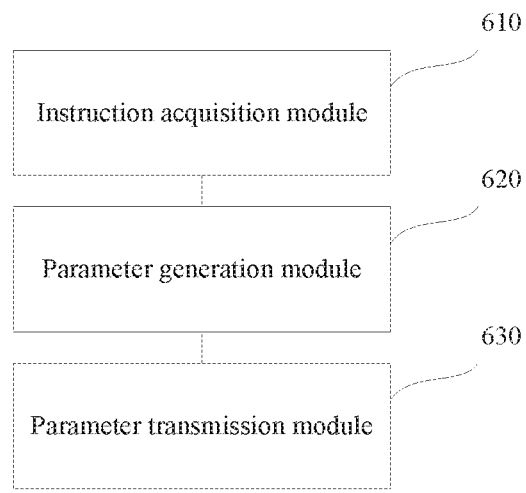
FIG. 6A shows a block diagram of an apparatus for controlling an unmanned aerial vehicle according to another aspect of the present disclosure.

FIG. 6A is a block diagram of an apparatus for controlling an unmanned aerial vehicle according to another aspect of the present disclosure. The apparatus has functions that implement various steps in the above-described method examples at the control device side. The functions may be implemented by hardware or may be implemented by using the hardware to implement the corresponding software. The apparatus may include: an instruction acquisition module 610, a parameter generation module 620, and a parameter transmission module 630.

The instruction acquisition module 610 may be configured to acquire a first setting instruction corresponding to a flight area of the unmanned aerial vehicle.

The parameter generation module 620 may be configured to generate a flight area control parameter according to the first setting instruction.

The parameter transmission module 630 may be configured to transmit the flight area control parameter to the unmanned aerial vehicle. The unmanned aerial vehicle may be configured to determine the flight area based on the flight area control parameter and cruise within the flight area.

In the apparatus provided by the present example, the control device may generate a flight area control parameter according to the first setting instruction, and may transmit the flight area control parameter to the unmanned aerial vehicle so that the unmanned aerial vehicle can determine the flight area based on the flight area control parameter and performs cruising in the flight area. By this way, the following problem can be solved: in the course of the flight of the unmanned aerial vehicle, the user needs to control the flight status of the unmanned aerial vehicle in real time, such requirement for the user may be too high, and thus the automatic flight capability of the unmanned aerial vehicle is poor. The following effects can be achieved: the unmanned aerial vehicle performs automatic cruising in the pre-set flight area, the user control is unnecessary in the flight process, and thus the automatic flight capability of the unmanned aerial vehicle is improved.

In an alternative example provided based on the example shown in FIG. 6A, the apparatus further may include: a first acquisition module or a second acquisition module.

The first acquisition module may be configured to acquire a flight path customized by a user within the flight area and to transmit the flight path to the unmanned aerial vehicle.

The second acquisition module may be configured to acquire a flight path within the flight area selected by the user from a pre-set flight path library and to transmit the flight path to the unmanned aerial vehicle.

Optionally, the first acquisition module may include: an instruction acquisition sub-module, a parameter generation sub-module, and a parameter transmission sub-module.

The instruction acquisition sub-module may further be configured to acquire a second setting instruction corresponding to the flight path of the unmanned aerial vehicle.

The parameter generation sub-module may be configured to generate a flight path control parameter according to the second setting instruction. The flight path control parameter may include positions of at least two passing points through which the flight path passes, and the flight path control parameter may be used to indicate a flight path within the flight area.

The parameter transmission sub-module may be configured to transmit the flight path control parameter to the unmanned aerial vehicle.

In one example, the flight area is a planar flight area, a linear flight area, or a three-dimensional flight area.

In one example, the parameter transmission module 630 may be further configured to send at least one of the following parameters to the unmanned aerial vehicle: a flight time control parameter, a flight number control parameter, and a flight speed control parameter.

The flight time control parameter may be used to indicate a flight time within the flight area, the flight number control parameter may be used to indicate a number of times of flights in the flight area where cruising in the flight area for one cycle is recorded as one flight, and the flight speed control parameter may be used to indicate a flight speed within the flight area.

Figure 6B:
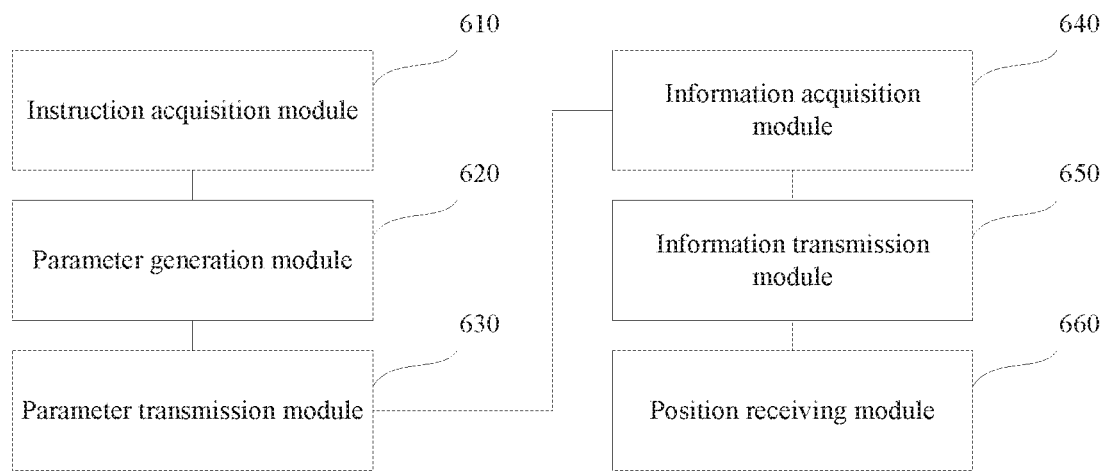
FIG. 6B shows a block diagram of an apparatus for controlling an unmanned aerial vehicle according to another aspect of the present disclosure.

In another alternative example provided based on the example shown in FIG. 6A, as shown in FIG. 6B, the apparatus further may include: an information acquisition module 640, an information transmission module 650, and a position receiving module 660.

The information acquisition module 640 may be configured to acquire feature information of a search target.

The information transmission module 650 may be configured to transmit the feature information of the search target to the unmanned aerial vehicle. The unmanned aerial vehicle may be configured to acquire an image during cruising, to detect whether the search target exists in the image based on the feature information of the search target. When it is detected that the search target exists in the image, the position information of the search target may be acquired.

The position receiving module 660 may be configured to receive the position information of the search target transmitted by the unmanned aerial vehicle.

Figure 7:
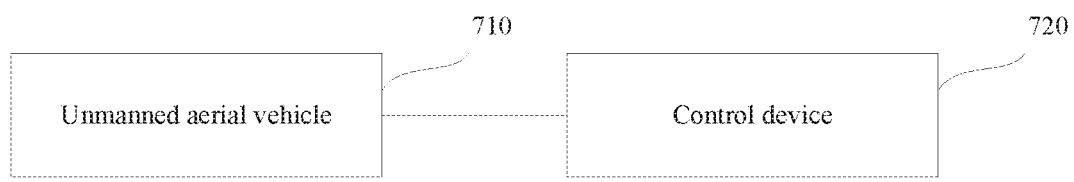
FIG. 7 shows a block diagram of a system for controlling an unmanned vehicle control according to an aspect of the present disclosure.

FIG. 7 is a block diagram of a system for controlling an unmanned aerial vehicle according to an aspect of the present disclosure. The system may include: an unmanned aerial vehicle 710 and a control device 720. A communication connection is established between the unmanned aerial vehicle 710 and the control device 720 over a wireless network.

The unmanned aerial vehicle 710 may include the apparatus described in the above-described example shown in FIG. 5A or any of alternative examples provided based on the example shown in FIG. 5A.

The control device 720 may include the apparatus described in the above-described example shown in FIG. 6A or any of alternative examples provided based on the example shown in FIG. 6A.

The apparatuses provided by the above examples are only exemplified to be divided as the above respective functional modules when achieving their functions. In applications, the above functions may be distributed to be achieved by different functional modules according to requirements. The interior structure of the devices may be divided into different functional modules for achieving all or a part of the above-described functions.

With respect to the apparatus in the above examples, the manners for performing operations for individual modules therein have been described in detail in the examples regarding the methods, and which are not elaborated herein.

The aspect of the present disclosure of the present disclosure also provides a device for controlling an unmanned aerial vehicle capable of implementing the control method on the unmanned aerial vehicle side provided by the present disclosure. The apparatus may include a processor and a memory for storing instructions executable by the processor. The processor may be configured to:

receive a flight area control parameter transmitted by a control device;

determine a flight area based on the flight area control parameter; and cruise within the flight area.

Alternatively, the processor may be configured to:
determine a flight path within the flight area; and
fly on the flight path periodically and repeatedly.

Alternatively, the processor may be configured to:
acquire the flight path customized by a user;
or,
acquire the flight path selected from a pre-set flight path library and transmitted by the control device.

Alternatively, the processor may be configured to:
determine the flight path customized by the user according to a flight path control parameter transmitted by the control device;
where the flight path control parameter may include positions of at least two passing points in the flight path customized by the user.

Alternatively, the flight area is a planar flight area, a linear flight area, or a three-dimensional flight area.

Alternatively, the processor may be configured to:
fly along the flight path to the second end of the flight path by using the first end of the flight path as a starting point;
fly along the flight path to the first end of the flight path by using the second end of the flight path as the starting point; and
fly along the flight path to the second end of the flight path by using the first end of the flight path as the starting point again.

Alternatively, the processor may be configured to:
receive at least one of following parameters transmitted by the control device: a flight time control parameter, a flight number control parameter, and a flight speed control parameter;
where the flight time control parameter is used to indicate a flight time within the flight area; the flight number control parameter is used to indicate a number of times of flights in the flight area, cruising in the flight area for one cycle is recorded as one time of flight; and the flight speed control parameter is used to indicate a flight speed within the flight area.

Alternatively, the processor may be configured to:
receive feature information of a search target transmitted by the control device;
collect an image during cruising;
detect whether the search target exists in the image based on the feature information of the search target;
when it is detected that the search target exists in the image, acquire position information of the search target; and
transmit the position information of the search target to the control device The aspect of the present disclosure also provides a device for controlling an unmanned aerial vehicle capable of implementing the control method on the control device side provided by the present disclosure. The apparatus may include a processor and a memory for storing instructions executable by the processor. The processor may be configured to:

acquire a first setting instruction corresponding to a flight area of the unmanned aerial vehicle;

generate a flight area control parameter according to the first setting instruction; and transmit the flight area control parameter to the unmanned aerial vehicle; wherein the unmanned aerial vehicle may be configured to determine the flight area based on the flight area control parameter and cruise within the flight area.

Alternatively, the processor may be configured to:
acquire a flight path within the flight area customized by a user and transmit the flight path to the unmanned aerial vehicle;
or,
acquire a flight path within the flight area selected by the user from a pre-set flight path library and transmit the flight path to the unmanned aerial vehicle.

Alternatively, the processor may be configured to:
acquire a second setting instruction corresponding to the flight path of the unmanned aerial vehicle;
generate a flight path control parameter according to the second setting instruction; wherein the flight path control parameter comprises positions of at least two passing points through which the flight path passes, and the flight path control parameter is used to indicate the flight path within the flight area; and
transmit the flight path control parameter to the unmanned aerial vehicle.

Alternatively, the flight area is a planar flight area, a linear flight area or a three-dimensional flight area.

Alternatively, the processor may be configured to:
transmit at least one of the following parameters to the unmanned aerial vehicle: a flight time control parameter, a flight number control parameter, and a flight speed control parameter;
where the flight time control parameter is used to indicate a flight time within the flight area; the flight number control parameter is used to indicate a number of times of flights within the flight area, cruising within the flight area for one cycle being recorded as one flight; and the flight speed control parameter is used to indicate a flight speed within the flight area.

Alternatively, the processor may be configured to:
acquire feature information of a search target; and
transmit the feature information of the search target to the unmanned aerial vehicle; where the unmanned aerial vehicle may be configured to collect an image during cruising, detect whether the search target exists in the image based on the feature information of the search target, and when it is detected that the search target exists in the image, acquire position information of the search target; and
receive the position information of the search target transmitted by the unmanned aerial vehicle.

Figure 8:
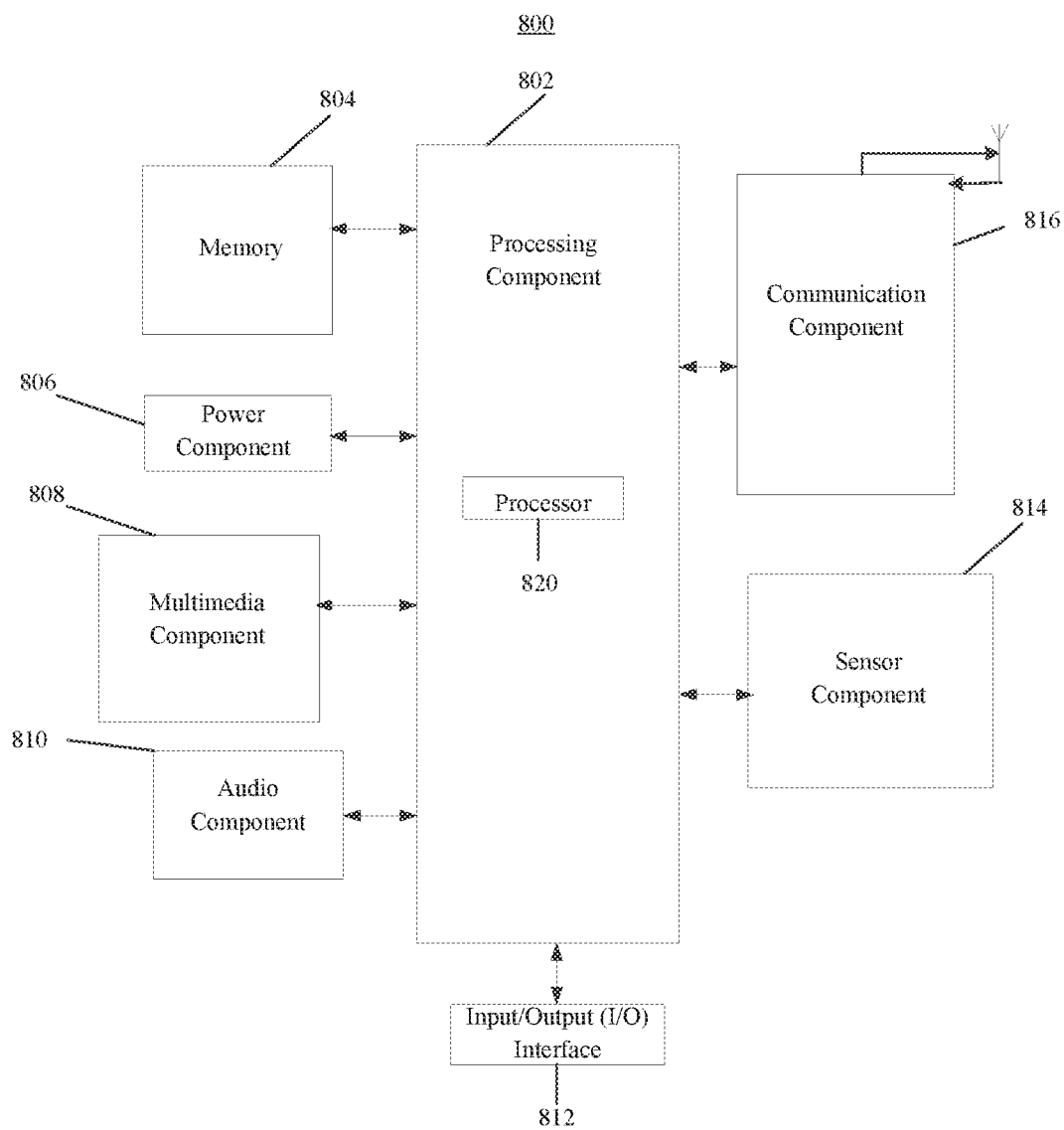
FIG. 8 shows a block diagram of an apparatus according to an aspect of the present disclosure.

FIG. 8 is a block diagram illustrating an apparatus 800, according to an aspect of the present disclosure. For example, the apparatus 800 may be the unmanned aerial vehicle involved in the above examples, or may be the control devices involved in the above examples.

Referring to FIG. 8, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 may be configured to store various types of data to support the operation of the apparatus 800. Examples of such data include instructions for any applications or methods operated on the apparatus 800, contact data, phonebook data, messages, pictures, videos, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 806 provides power to various components of the apparatus 800. The power component 806 may include a power management system, one or more power sources, and any other components associated with the generation, management, and distribution of power in the apparatus 800.

The multimedia component 808 may include a screen providing an output interface between the apparatus 800 and the user. In some examples, the screen may include a liquid crystal display (LCD) and a touch panel (TP). If the screen may include the touch panel, the screen may be implemented as a touch screen to receive input signals from the user. The touch panel may include one or more touch sensors to sense touches, swipes, and gestures on the touch panel. The touch sensors may not only sense a boundary of a touch or swipe action, but also may sense a period of time and a pressure associated with the touch or swipe action. In some examples, the multimedia component 808 may include a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have a focus and optical zoom capability.

The audio component 810 may be configured to output and/or input audio signals. For example, the audio component 810 may include a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some examples, the audio component 810 further may include a speaker for outputting the audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 may include one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 714 may also include a light sensor, such as a CMOS or CCD image sensor, for use in imaging applications. In some examples, the sensor component 814 may also include an accelerometer sensor, a gyroscope sensor, a magnetic sensor, a distance sensor, a pressure sensor, or a temperature sensor.

The communication component 816 may be configured to facilitate communication, wired or wirelessly, between the apparatus 800 and other devices. The apparatus 800 can access a wireless network based on a communication standard, such as WiFi, 2G or 3G; or a combination thereof. In one aspect of the present disclosure, the communication component 816 receives a broadcast signal or broadcast associated information from an external broadcast management system via a broadcast channel. In one aspect of the present disclosure, the communication component 816 further may include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In aspects of the present disclosure, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In aspects of the present disclosure, there is also provided a non-transitory computer-readable storage medium including instructions, such as included in the memory 804, executable by the processor 820 in the apparatus 800, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium is executed by a processor of the apparatus 800, enables the apparatus 800 to perform the above methods.

The term "plurality" mentioned herein is defined as two or more than two. The term "and/or" describes an association relationship of associated objects, and represents that there may be three relationships. For example, A and/or B may represent three situations including the single existence of A, the simultaneous existence of A and B, and the single existence of B. The symbol "/" generally represents that contextual objects are in an "or" relationship.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling an unmanned aerial vehicle, comprising:
   obtaining, by a processor, a flight area control parameter;
   determining, by the processor, a flight area based on the flight area control parameter;
   causing, by the processor, the unmanned aerial vehicle to cruise within the flight area; and
   wherein causing the unmanned aerial vehicle to cruise within the flight area comprises:
   determining, by the processor, a flight path within the flight area, and
   causing, by the processor, the unmanned aerial vehicle to fly on the flight path in a periodical manner and repeatedly in a reciprocating manner, wherein the reciprocating manner reciprocates the flight path within a flight time associated with a flight time control parameter, and
   wherein the flight area is at least one of: a planar flight area, a linear flight area, and a three-dimensional flight area.

2. The method according to claim 1, wherein determining the flight path within the flight area comprises at least one of:
   acquiring, by the processor, the flight path customized by a user; and
   acquiring, by the processor, the flight path selected from a pre-set flight path library.

3. The method according to claim 2, wherein acquiring the flight path customized by the user comprises:
   determining, by the processor, the flight path customized by the user according to a flight path control parameter, wherein the flight path control parameter comprises positions of at least two passing points in the flight path customized by the user.

4. The method according to claim 1, further comprising:
   obtaining, by the processor, at least one of: the flight time control parameter, a flight number control parameter, and a flight speed control parameter; and
   wherein the flight time control parameter is used to indicate a flight time within the flight area;
   the flight number control parameter is used to indicate a number of times of flights in the flight area wherein to cruise in the flight area for one cycle is recorded as one time of flight; and the flight speed control parameter is used to indicate a flight speed within the flight area.

5. The method according to claim 1, further comprising:
   obtaining, by the processor, feature information of a search target;
   collecting, by the processor, an image when the unmanned aerial vehicle cruises;
   detecting, by the processor, whether the search target exists in the image based on the feature information of the search target; and
   when it is detected that the search target exists in the image, acquiring, by the processor, position information of the search target.

6. An apparatus for controlling an unmanned aerial vehicle, comprising:
   a processor;
   a memory for storing instructions executable by the processor; and
   wherein the processor is configured to:
   receive a flight area control parameter transmitted by a control device,
   determine a flight area based on the flight area control parameter,
   control the unmanned aerial vehicle to cruise within the flight area, and
   wherein the processor is further configured to:
   determine a flight path within the flight area, and
   control the unmanned aerial vehicle to fly on the flight path in a periodical manner and repeatedly in a reciprocating manner, wherein the reciprocating manner reciprocates the flight path within a flight time associated with a flight time control parameter, and
   wherein the flight area is one of: a planar flight area, a linear flight area and a three-dimensional flight area.

7. The apparatus according to claim 6, wherein the processor is further configured to:
   acquire the flight path customized by a user; or
   acquire the flight path selected from a pre-set flight path library and transmitted by the control device.

8. The apparatus according to claim 7, wherein the processor is further configured to:
   determine the flight path customized by the user based on a flight path control parameter transmitted by the control device, wherein the flight path control parameter comprises positions of at least two passing points of the flight path customized by the user.

9. The apparatus according to claim 6, wherein the processor is further configured to:
   receive at least one of following parameters transmitted by the control device: the flight time control parameter, a flight number control parameter, and a flight speed control parameter; and
   wherein the flight time control parameter is used to indicate a flight time within the flight area;

the flight number control parameter is used to indicate a number of times of flights in the flight area wherein to cruise within the flight area for one cycle is recorded as one flight, and the flight speed control parameter is used to indicate a flight speed within the flight area.

10. The apparatus according to claim 6, wherein the processor is further configured to:
receive feature information of a search target transmitted by the control device;
collect an image when the unmanned aerial vehicle cruises;
detect whether the search target exists in the image based on the feature information of the search target; and
when it is detected that the search target exists in the image, acquire position information of the search target, and transmit the position information of the search target to the control device.

11. An apparatus for controlling an unmanned aerial vehicle, comprising:
a processor;
a memory for storing instructions executable by the processor; and
wherein the processor is configured to:
acquire a first setting instruction corresponding to a flight area of the unmanned aerial vehicle, generate a flight area control parameter according to the first setting instruction, and
transmit the flight area control parameter to the unmanned aerial vehicle; wherein the unmanned aerial vehicle is configured to determine the flight area based on the flight area control parameter and cruise within the flight area,
wherein the flight area is one of: a planar flight area, a linear flight area, and a three-dimensional flight area, and
wherein the unmanned aerial vehicle to fly on a flight path in a periodical manner and repeatedly in a reciprocating manner, wherein the reciprocating manner reciprocates the flight path within a flight time associated with a flight time control parameter.

12. The apparatus according to claim 11, wherein the processor is further configured to:
acquire the flight path customized by a user within the flight area and transmit the flight path to the unmanned aerial vehicle; or
acquire the flight path within the flight area selected by a user from a pre-set flight path library and transmit the flight path to the unmanned aerial vehicle.

13. The apparatus according to claim 12, wherein the processor is further configured to:
acquire a second setting instruction corresponding to the flight path of the unmanned aerial vehicle;
generate a flight path control parameter according to the second setting instruction, wherein the flight path control parameter comprises positions of at least two passing points through which the flight path passes, and the flight path control parameter is used to indicate the flight path within the flight area; and
transmit the flight path control parameter to the unmanned aerial vehicle.

14. The apparatus according to claim 11, wherein the processor is further configured to:
transmit at least one of following parameters to the unmanned aerial vehicle: the flight time control parameter, a flight number control parameter, and a flight speed control parameter; and
wherein the flight time control parameter is used to indicate a flight time within the flight area;
the flight number control parameter is used to indicate a number of times of flights in the flight area wherein to cruise within the flight area for one cycle is recorded as one flight; and the flight speed control parameter is used to indicate a flight speed within the flight area.

15. The apparatus according to claim 11, wherein the processor is further configured to:
acquire feature information of a search target; and
transmit the feature information of the search target to the unmanned aerial vehicle, wherein the unmanned aerial vehicle is configured to acquire an image when the unmanned aerial vehicle cruises, detect whether the search target exists in the image based on the feature information of the search target, and acquire position information of the search target when it is detected that the search target exists in the image, and receive the position information of the search target transmitted by the unmanned aerial vehicle.

* * * * *